No. 749,270. PATENTED JAN. 12, 1904.
J. DIETRICH.
SAW SET.
APPLICATION FILED MAY 27, 1902.
NO MODEL.

Witnesses
J. P. Brett

Inventor
J. Dietrich,
By Chandler & Chandler
Attorneys

No. 749,270. Patented January 12, 1904.

UNITED STATES PATENT OFFICE.

JOSEPH DIETRICH, OF ST. CLOUD, MINNESOTA.

SAW-SET.

SPECIFICATION forming part of Letters Patent No. 749,270, dated January 12, 1904.

Application filed May 27, 1902. Serial No. 109,204. (No model.)

*To all whom it may concern:*

Be it known that I, JOSEPH DIETRICH, a citizen of the United States, residing at St. Cloud, in the county of Stearns, State of Minnesota, have invented certain new and useful Improvements in Saw-Sets; and I do hereby declare the following to be a full, clear, and exact description of the invention, such as will enable others skilled in the art to which it appertains to make and use the same.

This invention relates to saw-sets; and it has for its object to provide a cheap and simple tool of this nature which may be employed for setting the teeth of all classes of saws and in the operation of which the tooth that is being set will be visible, so that proper engagement of the setting-jaw with the tooth will be insured.

Other objects and advantages of the invention will be understood from the following description and include a provision of means for determining the angle at which the saws will be set.

Figure 1:
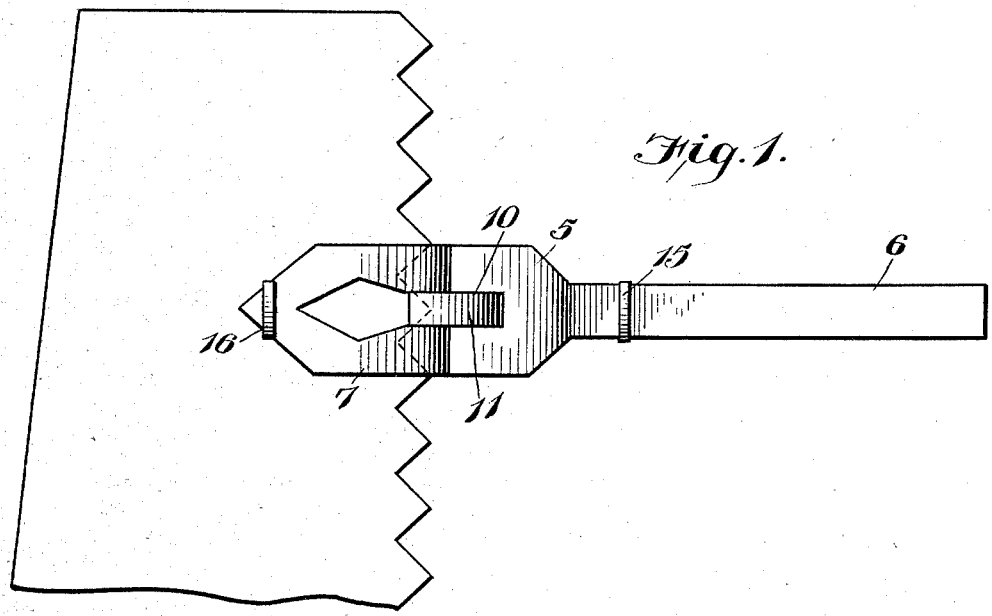
Figure 2:
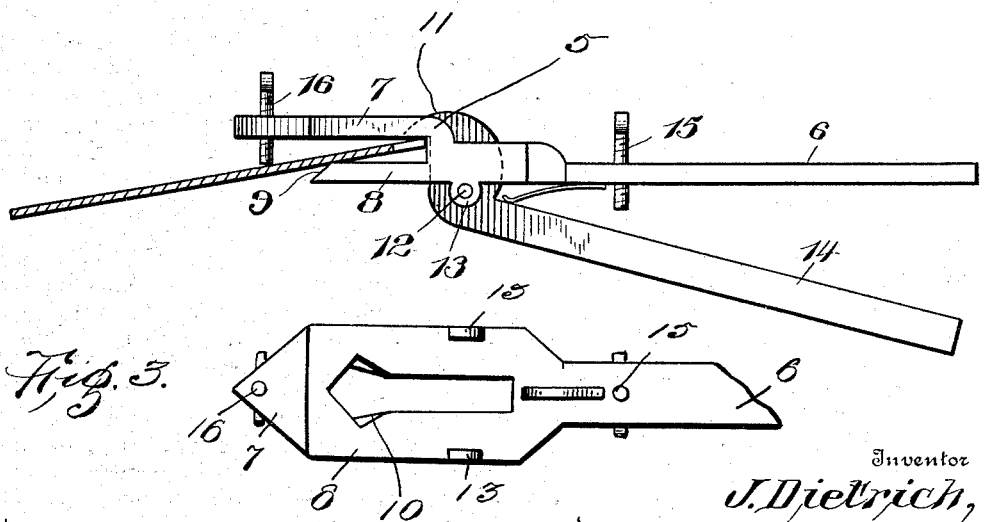
Figure 3:
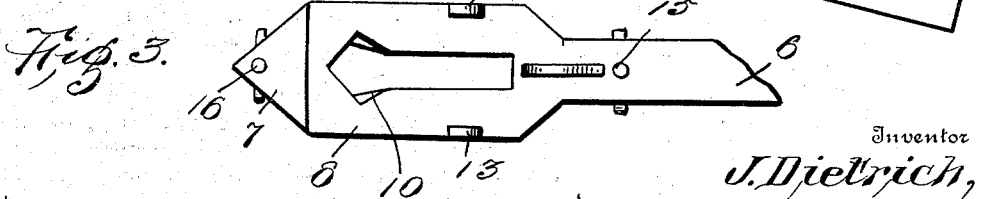

In the drawings forming a portion of this specification, and in which like numerals of reference indicate similar parts in the several views, Figure 1 is a top plan view of the saw-set engaged with the saw. Fig. 2 is a side elevation of the saw-set engaged with a saw. Fig. 3 is a bottom plan view of the upper member of the saw-set.

Referring now to the drawings, the present saw-set comprises a member including a head 5, from which extends rearwardly a handle 6, the opposite end of the head being bifurcated to form upper and lower portions 7 and 8, of which the latter is the anvil of the tool and terminates short of the outer end of the upper portion, the portions 7 and 8 being spaced apart sufficiently far to receive the blade of the saw to be set and to permit of holding the blade at different angles between said portions, the free end of the anvil 8 being beveled at its upper edge, as shown at 9, to form a rest for the saw-blade.

Through the head 5 is formed a slot 10, which is continued forwardly through both the upper and lower members or portions 7 and 8, and in the rear portion of the slot 10 is disposed the setting-jaw 11, having a shaft 12 journaled in bearings 13 on the under side of the head, said jaw having a handle 14 and forming, with its handle, the second main member of the tool.

The portion of the slot 10 which extends into the portions 7 and 8 of the handle is broadened, as shown.

In the use of the tool the blade of a saw is passed between the portions 7 and 8 and rests against or upon the anvil, the tool being positioned with the tip of the jaw 11 against the tooth to be set, the proper positioning of the jaw against the tooth being permitted by the sight of the jaw and the tooth, which is gained through the opening in the portion 7. When the saw has been properly positioned or the tool has been adjusted with respect to the saw, the handles are brought together and the jaw is moved against the tooth and the latter is bent, the extent of movement of the handles toward each other being determined by the set-screw 15, which is engaged with the handle 6 in position to engage the handle 14.

At the outer end of the portion 7 of the head is engaged a second set-screw 16, and by screwing the set-screw 16 inwardly against the saw previous to the setting operation the saw is moved on the bevel 9 as a pivot to increase the angle of the teeth to the anvil. Thus the positions of the two set-screws determine the angle at which the teeth are bent or, in other words, the degree of set of the teeth.

With this construction it will be seen that there is provided a tool which is light and simple, which may be easily and quickly adjusted to the teeth of the saw, and in the use of which the proper set of the teeth can be obtained.

What is claimed is—

A saw-set comprising a member including a head and a handle the head being transversely slotted to form an anvil and an upper portion lying thereabove, the anvil terminating short of upper portion, said head having a slot therein extending through the anvil and the upper portion, a jaw pivoted on the lower side of the head and passing through the second-named slot at a point beyond the termination of the transverse slot, said jaw having a handle movable toward and away from the first-named handle, and a set-screw arranged in one of the handles and disposed for contact by the other handle.

In testimony whereof I affix my signature in presence of two witnesses.

JOSEPH DIETRICH.

Witnesses:
   JOSEPH DIETRICH,
   J. J. KRONENBERY.